April 14, 1970     D. M. DE HART     3,506,852
METHOD AND APPARATUS TO PROVIDE ZERO ANGLE FIRING
OF A STATIC LATCHING SWITCH IN A
NOISE-FREE ELECTRIC CONTROLLER
Filed March 10, 1967     3 Sheets-Sheet 1
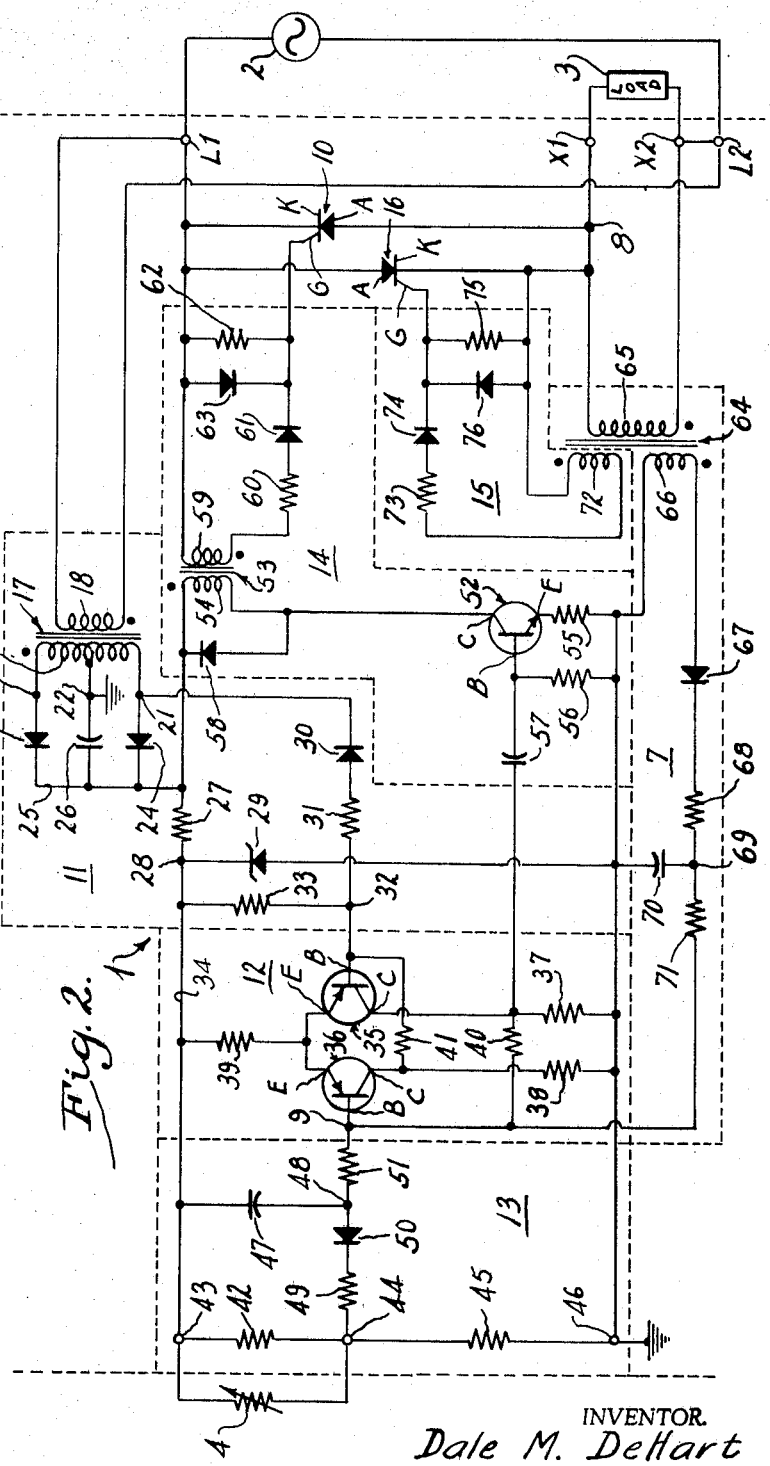
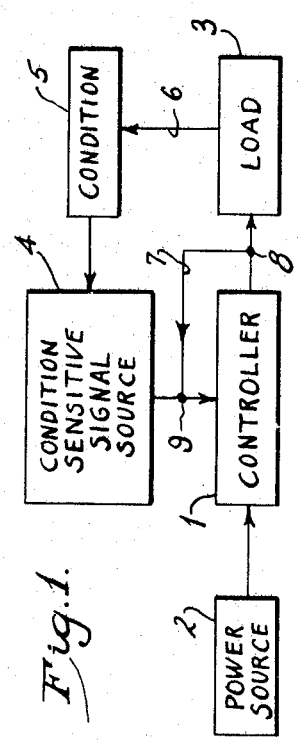
INVENTOR.
Dale M. DeHart
BY
AGENT

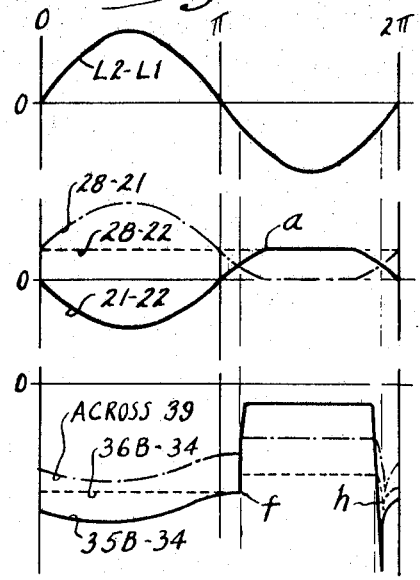
Fig. 4.
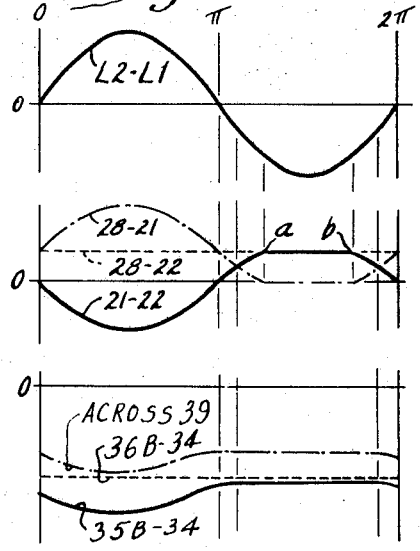
Fig. 3.
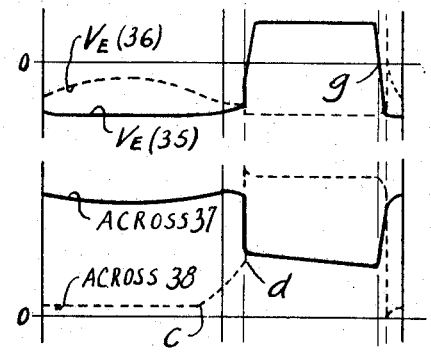
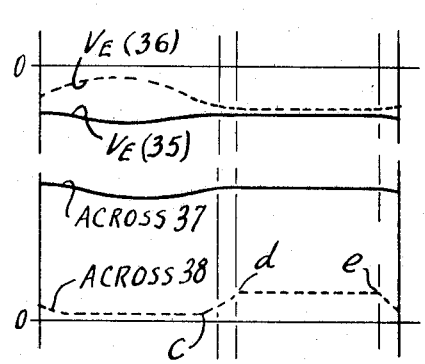
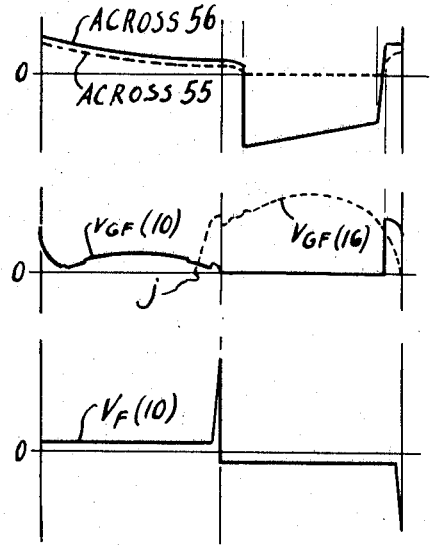
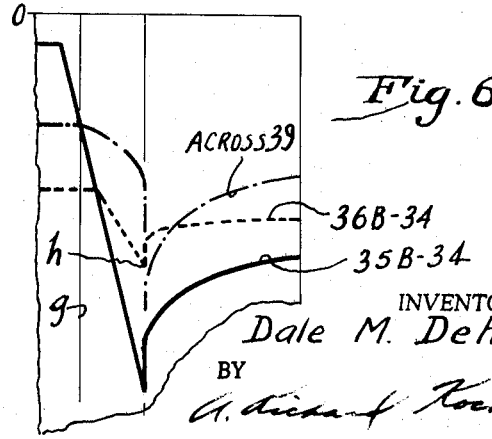
Fig. 6.
INVENTOR.
Dale M. DeHart
BY
AGENT April 14, 1970 D. M. DE HART 3,506,852
METHOD AND APPARATUS TO PROVIDE ZERO ANGLE FIRING
OF A STATIC LATCHING SWITCH IN A
NOISE-FREE ELECTRIC CONTROLLER
Filed March 10, 1967 3 Sheets-Sheet 3

INVENTOR.
Dale M. DeHart
BY
AGENT 3,506,852
METHOD AND APPARATUS TO PROVIDE
ZERO ANGLE FIRING OF A STATIC
LATCHING SWITCH IN A NOISE-FREE
ELECTRIC CONTROLLER
Dale M. De Hart, Rockford, Ill., assignor to Barber-Colman Company, Rockford, Ill., a corporation of Illinois
Filed Mar. 10, 1967, Ser. No. 622,114
Int. Cl. H03k 17/00
U.S. Cl. 307—252                    13 Claims

ABSTRACT OF THE DISCLOSURE

This noise-free controller for alternating or pulsating current employs a flip-flop receiving a condition responsive signal and a synchronizing signal to fire at zero angle a static latching switch controlling flow of current to a load. By adding a feedback from the latching switch to the flip-flop, a burst length proportioning control is obtained, alternately conducting and non-conducting for varying integral numbers of half cycles or pulses as a function of the condition responsive signal.

Background of the invention

This invention concerns an automatic electrical control wherein means are provided which control the effective current supplied from an electrical source circuit to an electrical load circuit. The means is characterized by the use of a latching switch selectively conducting current between the source and the load in response to an energizing signal, firing only when the voltage from said source passes through zero in a prescribed direction while a predetermined condition is being sensed. It may also include a negative feedback circuit for periodically eliminating the energizing signal for a predetermined number of half-cycles to provide a proportioning control.

Whenever an electrical circuit is closed or opened at random there is a sharp discontinuity in the flow of current unless the closing or opening is accomplished at an instant when the closed circuit current flow would ordinarily be zero. Such discontinuities cause electrical noise that interferes with the operation of sensitive electrical equipment such as radio, television, and some controls. When this interference is rare or of short duration, it may usually be condoned, but, with the increasing use of controlled rectifiers and other latching switches to effectively modulate alternating or pulsating current flow by phase angle control of triggering, the problem can no longer be tolerated in many applications. Controlled rectifiers and other latching switches have so many desirable characteristics that they can not easily be eliminated as control components. Effort has therefore been concentrated recently upon finding other ways to eliminate or greatly reduce the electrical noise produced by controls employing them. The obvious solution lies in triggering the controlled rectifier into conduction just as the alternating voltage passes through zero and begins to increase in the forward conduction direction of the controlled rectifier. Such a solution eliminates the objectionable noise, but does not provide for modultaion of the controlled current. This is effectively accomplished by incorporating burst length proportioning.

A latching switch is a device that, after being rendered conductive, continues to conduct current in the same direction until the current flow is reduced to zero. A controlled rectifier is an example of a unidirectionally conductive latching switch. Bidirectionally conductive static latching switches conduct current in whichever direction it begins to flow when the switch is rendered conductive. They are commonly called Triacs.

A controller employing burst length proportioning modulates the effective current supplied to a load by alternate conduction and non-conduction of current between the power supply and the load in bursts of varying integral numbers of successive half-waves, or other pulses of current. At any given time the controller is either completely on or completely off, but the on and off periods are so short that the effect is comparable to that obtained by current magnitude control.

Summary

This invention provides a method for substantially eliminating the generation of electrical noise resulting from on-off operation of a controller. It provides a novel electric controller employing means for rendering a latching switch, controlling the flow of current from an electric power supply to a load, conductive only at the instant when the voltage of the controlled power supply is at zero and increasing in a forward conduction direction of said latching switch in response to an input signal and a signal synchronized with the voltage variation in the controlled power supply. It also provides a novel burst length proportioning electric controller for rendering a latching switch, controlling the flow of current from an electric power supply to a load, non-conductive for an integral number of pulses of voltage in the power supply after the latching switch had been rendered conductive for another integral number of pulses of current, each beginning at an instant when the voltage of the controlled power supply is at zero and increasing in a forward conduction direction of said latching switch. The invention further provides for making operation of such controllers automatic as a function of an input signal obtained from a condition responsive sensor.

While this controller is of primary value in controlling electric heat, it may also be employed to modulate light from electric lamps, preferably operated on freqeuncies high enough to eliminate visible flicker. It can control any zero power factor load without generating objectionable electric noise.

Brief description of drawings

FIG. 1 is a block diagram of a typical control system employing a herein described controller.

FIG. 2 is a circuit diagram of a preferred embodiment of the controller and its external connections.

FIG. 3 is a series of graphs, copied from oscillograph traces, showing the relationship of various voltages with the passage of time when the SCR's in FIG. 2 are not conducting current to the load.

FIG. 4 is a series of graphs, as in FIG. 3, but showing the relationships when current is continuously flowing through the load.

FIG. 6 is an enlargement of a portion of FIG. 4.

Description of the preferred embodiment

Figure 5:
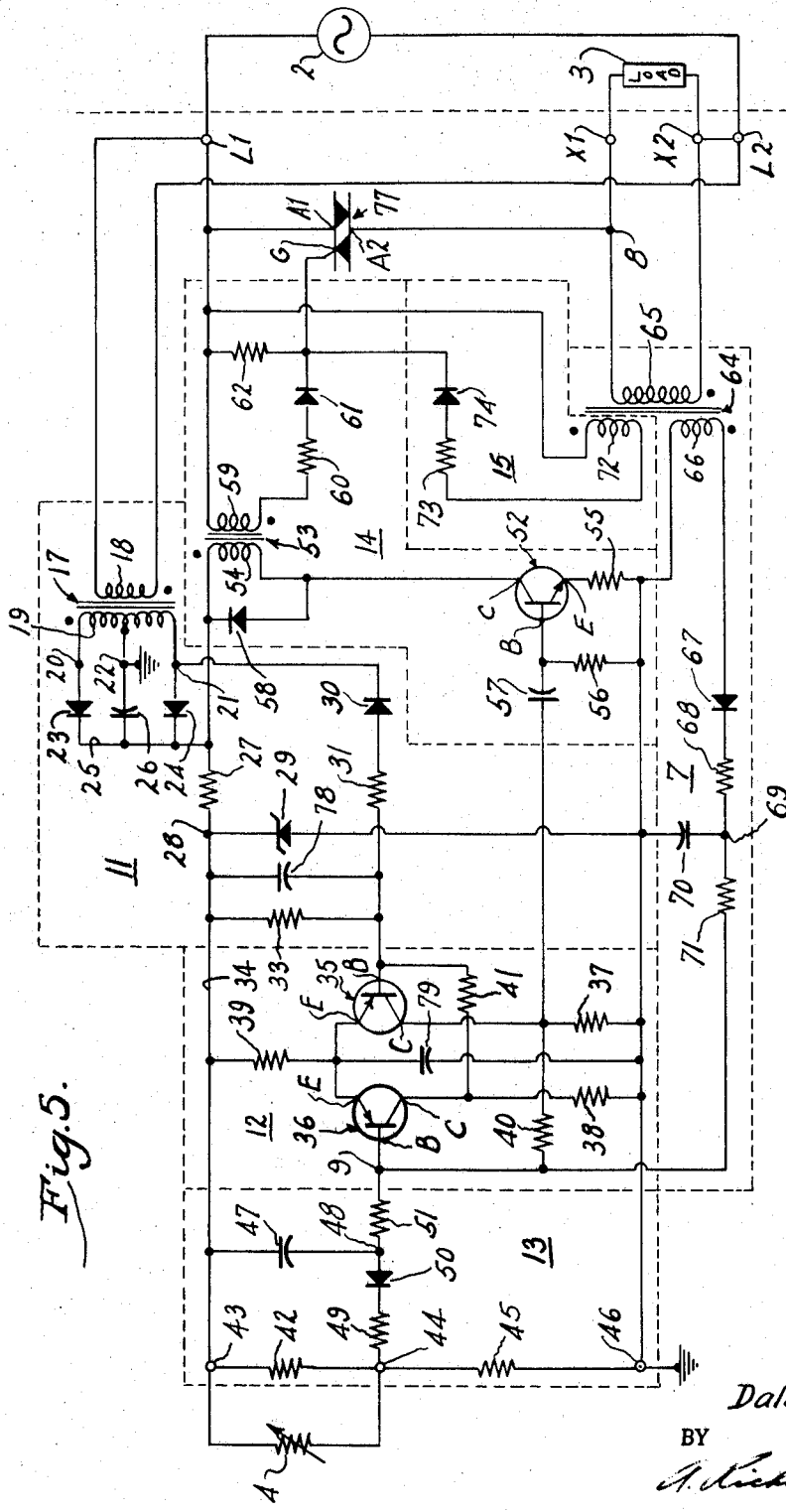
FIG. 5 is a modification of FIG. 2 using a Triac.

The control system as shown in FIG. 1 is representative of the type of system in which this invention may be used. It consists essentially of a controller 1 controlling the flow of power from a power source 2 to a load 3 in response to a signal obtained from a condition sensitive signal source 4 and fluctuating with the sensed condition 5. This is an open loop control system in which the operation of the load does not necessarily have any affect upon the condition being sensed. If the load 3 modifies the sensed condition 5 as shown by the external feedback connection 6, a closed loop system is created. The controller 1 employed in either of these loops may be an "on-off" or a proportioning controller. If the controller 1 is of the proportioning type it may also have an internal feedback circuit 7 (shown for convenience outside the controller block) between the controller output terminal 8 and the controller input terminal 9. Typically the power source 2 may be an AC electric power line, the load 3 an electric heating element, the condition sensitive signal source 4 a Thermostatic Unit described in the Paul H. Brace Patent No. 3,305,176 issued on Feb. 21, 1967, and the controlled condition 5 the room temperature.

A preferred embodiment of this invention is shown in FIG. 2. The controller 1 comprises a first latching switch 10, internal power supplies 11, a flip-flop 12, a voltage dividing signal network 13, triggering means 14 for rendering said latching switch 10 conductive, internal feedback circuit 7, a slave firing circuit 15 and a second latching switch 16. The power source 2, load 3 and condition sensitive signal source 4 are also shown in FIG. 2 to make clear just how they are connected to the controller 1. The voltage dividing signal network 13 is shown as part of the controller 1, but it could also be considered as part of the condition sensitive signal source 4.

The latching switch 10 is shown as a controlled rectifier (hereafter referred to as an SCR) having anode A, cathode K and gate G terminals. The SCR 10 is connected at its anode A and cathode K power terminals in series between the power source 2 at line terminal L1, and at load terminal X1, to the load 3, which may typically be an electric heating element, so that it may complete a circuit from the power source 2 at line terminal L2 through load terminal X2, load 3, load terminal X1, output terminal 8, anode to cathode circuit 10A–K and back to power source 2 at line terminal L1.

The internal power supplies 11 have a power transformer 17 with its primary winding 18, connected across power source 2 between line terminals L1 and L2, and a secondary winding 19, having ends 20 and 21 and a grounded center-tap 22. Diodes 23 and 24 conduct alternate half-wave pulses of current from ends 20 and 21 respectively to conductor 25 and a smoothing capacitor 26 is inserted between conductor 25 and ground at center-tap 22. Conductor 25 is connected through a voltage dropping resistor 27, junction 28 and a Zener diode 29 to ground. End 21 is connected through diode 30, resistor 31, input terminal 32, bias resistor 33 and conductor 34 to junction 28, said diode 30 being poled to block current flowing from end 21.

The flip-flop 12 comprises a pair of PNP transistors 35 and 36, each having a base B, an emitter E and a collector C, a pair of collector resistors 37 and 38 joining the collectors 35C and 36C respectively to ground, a common emitter resistor 39 between both of said emitters 35E and 36E and conductor 34, a coupling resistor 40 joining the collector 35C to the base 36B at input terminal 9, and coupling resistor 41 joining the collector 36C to the base 35B.

The voltage dividing signal network 13 contains a resistor 42 connected between sensor terminal 43 on conductor 34 and sensor terminal 44, resistor 45 connected between sensor terminal 44 and ground terminal 46 at ground to form a voltage divider between conductor 34 and ground. An integrating circuit includes integrating capacitor 47 joining line 34 to signal terminal 48, delay resistor 49, and blocking diode 50 in series between conductor 34 and sensor terminal 44. An isolating resistor 51 connects signal terminal 48 to input terminal 9.

The energizing means 14 contains a trigger signal amplifying NPN transistor 52, having a base B, an emitter E and collector C, to control the operation of pulse transformer 53, the primary winding 54 of which is connected in series between conductor 25 and the collector 52C. A common emitter resistor 55 is connected between the emitter 52E and ground. Bias resistor 56, connected between base 52B and ground, and capacitor 57 form a differentiating circuit shunting collector resistor 37. A diode 58 shunts primary winding 54 and is poled to block current from conductor 25 to collector 52C. The secondary winding 59 of pulse transformer 53 is in series with a current limiting resistor 60, a diode 61 and the gate-cathode junction 10G–K, said diode 61 being poled to provide positive potential to gate 10G. A bias resistor 62 is connected between the gate 10G and cathode 10K. A protective diode 63, shunting bias resistor 62, is poled to pass current from cathode 10K to gate 10G.

A feedback circuit 7 includes feedback transformer 64 having its primary winding 65 shunting load 3. A secondary winding 66 is in series with diode 67, and an integrating circuit comprising delay resistor 68, feedback junction 69 and the grounded integrating capacitor 70. The feedback junction 69 is connected through resistor 71 to the controller input terminal 9.

In the slave firing circuit 15 tertiary winding 72 on feedback transformer 64 is in series with current limiting resistor 73, diode 74 and the gate-cathode junction 16G–K, the diode being poled to provide positive voltage to the gate 16G. A bias resistor 75 is connected between gate 16G and cathode 16K, and a protective diode 76, shunting resistor 75, is poled to pass current from cathode 16K to gate 16G.

The circuit shown in FIG. 5 is, with a few exceptions, identical to FIG. 2 and employs the same reference numerals for identical components. A bidirectional latching switch, or Triac 77, having a gate G and anodes A1 and A2, replaces the SCR's 10 and 16. Anode 77A1 is common to the gate and power circuits and is connected to line terminal L1, while anode 77A2 is connected to output terminal 8. A phase-shifting capacitor 78 parallels bias resistor 33. A stabilizing capacitor 79 is inserted between both emitters 35E and 36E and ground. Protective diodes 63 and 76 and the bias resistor 75 are eliminated. Secondary winding 59 is in series with current limiting resistor 60, diode 61 and the gate to anode circuit 77G–A1, the diode 61 being poled to provided positive voltage to gate 77G. Tertiary winding 72 is in series with the current limiting resistor 73, diode 74 and the gate to anode circuit 77G–A1, the diode 74 being poled to provide positive voltage to gate 77G. Bias resistor 62 is connected between the gate 77G and anode 77A1.

Operation of the preferred embodiment

When the controller 1 has its line terminals L1 and L2 connected to an AC power source 2, its load terminals X1 and X2 connected to a load 3 and its sensor terminals 43 and 44 connected to the condition sensitive signal source 4, it is ready for operation. The primary winding 18 of power transformer 17 is energized directly by the power source 2 through line terminals L1 and L2. Diodes 23 and 24 are connected to alternately conduct current from the respective ends 20 and 21 of the center-tapped secondary winding 19 to conductor 25 when the ends are positive with respect to the ground center-tap 22. Smoothing capacitor 26 charges when the voltage between conductor 25 and ground (at center-tap 22) is increasing and discharges as this voltage is decreasing to produce a regularly modulated DC voltage between conductor 25 and ground, which is impressed across voltage dropping resistor 27, junction 28 and Zener diode 29 in series so that the drop in voltage due to current flow through resistor 27, when the Zener voltage of diode 29 is exceeded, regulates at a substantially constant value the DC voltage between the regulated voltage junction 28 and ground.

For convenience we will take conductor 34, connected to junction 28, as the reference in the following discussion. Bias resistor 33, coupling resistor 41 and collector resistor 38 form a voltage divider between conductor 34 and ground to produce a reference bias voltage at input terminal 32 for the base 35B. If the signal source 4 has an open circuit, the voltage divider formed by resistors 42 and 45 between conductor 34 and ground provides at sensor terminal 44 a maximum voltage greater than the reference bias voltage at input terminal 32. Since any shunting of resistor 42 by the signal source 4 or by the capacitor 47, diode 50 and resistor 49 in series results in a lower voltage across resistor 42, its value may be either greater or less than the reference bias voltage. The voltage across capacitor 47 will tend to be equal to the voltage across resistor 42, but will lag behind it due to the voltage drops in delay resistor 49 and diode 50. The diode 50 isolates capacitor 47 from any ripple introduced by the condition responsive signal source 4. The voltage at signal terminal 48 is determined by this variable voltage across integrating capacitor 47. A voltage divider comprising resistor 51, coupling resistor 40 and collector resistor 37 in series between signal terminal 48 and ground determines, in the absence of feedback, the voltage applied at input terminal 9 to the base 36B. The voltage between base 36B and conductor 34 is therefore somewhat greater than the voltage across capacitor 47 and may be more or less than the reference bias voltage depending upon the amount by which resistor 42 is shunted by signal source 4. The transistor 36 will conduct current from conductor 34 through common emitter resistor 39, the emitter-collector circuit 36E–C and collector resistor 38 to ground in proportion to the voltage applied across the emitter junction 36B–E. In like manner transistor 35 will conduct current from conductor 34 through common emitter resistor 39, the emitter-collector circuit 35E–C and collector resistor 37 to ground in proportion to the voltage applied across emitter junction 35B–E. It will be noted that the circuits are not independent, since collector current flowing through collector resistor 38 increases the voltages across it and thus reduces the voltages applied to the base 35B as determined by the voltage divider comprising resistors 33, 41 and 38. In like manner collector current flowing through load resistor 37 increases the voltage across it and thus reduces the voltage applied to the base 36B as determined by the voltage divider comprising capacitor 47 and resistor 51, 40 and 37. If we assume that at a given time the voltage $V_E(36)$ applied to the base-emitter junction 36B–E exceeds the voltage $V_E(35)$ applied to the base-emitter junction 35B–E, transistor 36 will permit more collector current to flow through collector resistor 38 than transistor 35 will permit to flow through collector resistor 37, causing the voltage applied to the base 35B to be reduced. This reduction in voltage on base 35B results in a lower $V_E(35)$ and consequently a still lower collector current through collector resistor 37. This process is continuous and thus rapidly accelerates the transfer of current flow from transistor 35 to transistor 36 until all of the current may flow through transistor 36 and none through transistor 35. In like manner the transistor 35 may carry all of the current and transistor 36 none when $V_E(35)$ exceeds $V_E(36)$.

When the voltage at end 21 of power transformer 17 falls below the regulated voltage at junction 28, a resetting current tends to flow from junction 28 through conductor 34, bias resistor 33, limiting resistor 31, blocking diode 30, end 21 and secondary winding 19 to ground at center-tap 22. As the voltage difference between end 21 and junction 28 increases, the resulting resetting current through bias resistor 33 creates a bias voltage thereacross that overrides the reference voltage and drives the base 35B, connected to input terminal 32, more and more negative until transistor 35 is forced to conduct more current than transistor 36 and so reset the flip-flop 12 if transistor 36 has been the dominant conductor. This happens before end 21 becomes negative with respect to center-tap 22 so that transistor 35 always resets the flip-flop 12 while the AC supply voltage at terminal L2 is negative with respect to terminal L1. Whenever transistor 35 is conducting, as it always is when the flip-flop 12 is reset, the bias resistor 33 is shunted by the common emitter resistor 39 and the emitter junction 35B–E in series, limiting $V_E(35)$ and so permitting transistor 36 to again become dominant conductor if $V_E(36)$ is greater than $V_E(35)$.

Let us assume that at time zero, as shown in FIG. 3, the voltage supplied from the AC power source 2 is zero, that terminal L2 is becoming positive with respect to terminal L1 and that sensor 4 is calling for no heat. The sensor 4 will therefore be shunting resistor 42 to provide a signal voltage at signal terminal 48 less than the reference bias voltage at input terminal 32. This signal voltage is applied through isolating resistor 51 to the transistor base 36B at input terminal 9 and remains substantially constant at the value established across resistor 42. The voltage applied to the base 35B is not constant, but varies with the value of the resetting current. The reset voltage between regulated voltage junction 28 and end 21 is obtained by substracting from the regulated voltage at junction 28 the voltage induced in secondary winding 19 between end 21 and ground at 22, limited to the Zener value, as between $a$ and $b$ in FIG. 3, when end 21 is positive. This reset voltage causes an increase in the current flowing through bias resistor 33, increasing the voltage thereacross and so changing the voltage applied to base 35B. The voltage across the common emitter resistor 39 and the $V_E(35)$ are similarly affected, since they form a series shunt around bias resistor 33. Because the conductor 34 to ground voltage is held constant while the voltage across the common emitter resistor 39 is increasing and the transistor 35 is turned full on, the voltage across collector resistor 37 will decrease. The increase in voltage across the common emitter resistor 39 reduces the $V_E(36)$ available and so drives transistor 36 out of conduction. The voltage shown in FIG. 3 as appearing across collector resistor 38 results from the voltage divider comprising resistors 33, 41 and 38. As the voltage across common emitter resistor 39 decreases with the decrease in resetting current, the emitter voltage $V_E(36)$ increases and eventually causes some conduction through the emitter collector circuit 36E–C, resulting in an increase in voltage across collector resistor 38 beginning at $c$ to a value at $d$ dependent upon the signal voltage at terminal 48 and the voltage across the common emitter resistor 39. The voltage across collector resistor 38 then remains constant until at $e$ it begins to fall as the increase in resetting current causes the voltage across the common emitter resistor 39 to increase. The drop in voltage across collector resistor 38 continues until it again reaches the value established by the voltage divider comprising resistors 39, 41 and 38. Since the signal voltage at signal terminal 48 has been specified as being less than the bias reference voltage at input terminal 32, and because both transistors 35 and 36 employ the same common emitter resistor 39, $V_E(36)$ will always be less than $V_E(35)$ with the result that transistor 35 will always be turned substantially full on even though transistor 36 may conduct some current. As a result there is little change in the voltage across collector resistor 37. The differentiating capacitor 57, connected in a series circuit with resistor 56 across collector resistor 37, will therefore remain substantially completely charged so that little voltage will appear across resistor 56 and the parallel circuit comprising emitter junction 52B–E in series with common emitter resistor 55. Since the voltage across the emitter junction 52B–E is so infinitesimal, transistor 52 will not permit sufficient current to flow through the primary winding 54 of pulse transformer 53 for SCR 10 to be fired. Diode 58, by providing a path for current, limits the voltage induced in primary winding 54 when transistor 52 ceases conduction.

When sensor 4 detects a correctable error between sensed and set point conditions, its effective resistance increases, causing the voltage across resistor 42 to increase to a value higher than the reference bias voltage. The voltage across capacitor 47 will lag behind this increase but eventually match it, so that the signal voltage at signal terminal 48 is also somewhat higher than the bias reference voltage. This signal voltage remains substantially invariable at any value established across resistor 42 after allowing for the time lag. In the absence of feedback this signal voltage is applied to the base 36B at the controller input terminal 9 through isolating resistor 51. Let us again assume that at time zero the line terminal L2 is at zero voltage and moving positive with respect to line terminal L1, as in FIG. 4. Due to the effects of the resetting current previously described the voltage at base 35B will still be more negative than at base 36B, so transistor 35 will conduct substantially all of the current through flip-flop 12 for the time being. As the resetting current diminishes, transistor 36 begins to conduct more current as shown by the gradual rise in voltage across load resistor 38 beginning at $c$ and ending at $d$ as before, but now causing the voltage on the base 35B to fall below that on base 36B, as at $f$. Since the reset current has not yet become zero, it becomes obvious that point $f$ will be reached in time before point $a$, previously established in FIG. 3. Because the common emitter resistor 39 is shared by transistors 35 and 36, $V_E(36)$ exceeds $V_E(35)$ at this point and transistor 36 takes over conduction of all current through flip-flop 12 as seen by the sharp rise in voltage across collector resistor 38 and the correspondingly sharp drop across load resistor 37. $V_E(35)$ is driven positive by the increased current through collector resistor 38 in the voltage divider comprising resistors 33, 41 and 38 and remains so until the resetting current flowing through bias resistor 33 again drives it negative at $g$, well before the voltage between line terminals L2 and L1 reaches zero. During this period transistor 35 cannot conduct. The voltage remaining across collector resistor 37 during this period is due to the discharge of differentiating capacitor 57 through resistors 37 and 56 in series. At $g$ transistor 35 begins to conduct, as shown by the increase in voltage across load resistor 37, the lag being due to the charging of capacitor 57. The additional current flowing through common emitter resistor 39 raises the voltage thereacross until it exceeds the voltage of base 36B at $h$ and $V_E(36)$ becomes positive, cutting off all conduction by transistor 36, as shown by the sharp drop in voltage across collector resistor 38, to reset the flip-flop 12. Reset occurs well before the line voltage reaches zero at $2\pi$. The lag in the recovery of the various other voltages beyond $h$ is also traceable to the charging of capacitor 57.

While transistor 35 is conducting, capacitor 57 is charged by current flowing from conductor 34 through common emitter resistor 39, the emitter-collector circuit 35E–C, capacitor 57 and bias resistor 56 to ground. The capacitor 57 behaves almost as a short circuit when transistor 35 begins to conduct, permitting a large current to flow through bias resistor 56 and so causing a relatively high initial voltage to appear across it at $h$. The capacitor charges rapidly at first, causing the current through bias resistor 56 to fall and rapidly reduce the voltage across it, before leveling off as the capacitor 57 becomes more fully charged. Resistor 56 is shounted by the emitter junction 52B–E and common emitter resistor 55 in series so the base-emitter voltage $V_E(52)$ and the current through common emitter resistor 55 is dependent upon the voltage across bias resistor 56 while capacitor 57 is charging. The discharge of capacitor 57 through load resistor 37, ground and resistor 56 when transistor 35 is not conducting, causes a reverse voltage to appear across resistor 56. No current flows through common emitter resistor 55 while the capacitor 57 is discharging due to this reverse voltage being applied to the emitter junction 52B–E. Throughout the period during which emitter junction 52B–E is conducting current, the collector-emitter circuit 52C–E is rendered conductive, permitting a simultaneous and proportionally larger current to flow from conductor 25 through primary winding 54, the collector-emitter circuit 52C–E and common emitter resistor 55 to ground. This current is proportional to the voltage across common emitter resistor 55 in FIG. 4. The resulting pulse of current through primary winding 54 induces a similar substantially simultaneous pulse of voltage in the secondary winding 59. This induced voltage causes a current to flow from secondary winding 59 through current limiting resistor 60, diode 61, and bias resistor 62 back to secondary winding 59, creating a voltage across bias resistor 62 and between the control terminals 10G and 10K such that the gate 10G to cathode 10K voltage $v_{GF}(10)$ is positive and SCR 10 is energized to permit load current to flow from the AC power source 2 at line terminal L2 through load terminal X2, load 3, load terminal X1, controller output terminal 8 and the anode-cathode circuit 10A–K back to the power source 2 at line terminal L1 when line terminal L2 becomes positive to line terminal L1 at $2\pi$ (or 0) and until the current is reduced to zero at $\pi$. This current flow results in a forward voltage $V_F(10)$ between anode 10A and cathode 10K. Because the flip-flop 12 is always reset at $h$, which occurs before L2 becomes positive with respect to L1 at $2\pi$ (or 0) and subsequent action leading up to the energization of SCR 10 occurs substantially simultaneously, and since the gate-cathode voltage $v_{GF}(10)$ declines from its initial value, the SCR 10 will always fire at zero voltage at $2\pi$ (or 0) if it fires at all. The rise and fall in $v_{GF}(10)$ while SCR 10 is conducting is due to the forward current $i_F(10)$ from anode to cathode 10A–K which creates a proportional voltage across the gate-cathode junction 10G–K. It is this voltage that maintains conduction through the anode-cathode circuit 10A–K after the SCR is triggered. When the forward current $i_F(10)$ falls below the required holding current $I_H(10)$ through the gate-cathode junction 10G–K, the SCR 10 ceases conduction, resulting in the sharp spike in the forward voltage $V_F(10)$ at the end of the conducting period when line voltage appears as forward voltage $V_F(10)$. Diode 63 prevents negative gate voltage $v_{GF}(10)$ from becoming excessive.

So far an on-off operation has been described permitting entire half waves of current to flow through the load whenever the sensed condition falls short of a desired condition. The operation of the feedback providing proportioning operation will now be described.

An integrating capacitor 70 is normally charged from conductor 34 through capacitor 47, signal terminal 48, resistor 51, controller input terminal 9 and resistor 71 to the voltage applied at input terminal 9 to base 36B. Since the voltage at base 36B is not constant but varies with the sensed condition and the conduction of transistor 35, the normal charge on capacitor 70 will also vary, lagging behind the voltage on base 36B because of the voltage drop in resistor 71 as capacitor 70 is alternately charged and discharged in attempting to follow the variations in voltage at base 36B. Whenever SCR 10 is conducting current, some current flows from power source 2 at line terminal L2 through load terminal X2, primary winding 65, controller input terminal 8, SCR 10 from anode A to cathode K, back to power source 2 at line terminal L1. This current passing through primary winding 65 of transformer 64 induces a voltage in secondary winding 66, causing a current to flow from secondary winding 66 through diode 67, limiting resistor 68, feedback junction 69, integrating capacitor 70, and ground back to secondary winding 66, charging integrating capacitor 70 to a higher voltage when the induced voltage is higher than its normal charge. This higher voltage appearing at feedback junction 69 is applied to the voltage divider comprising resistors 40, 51 and 71 causing the voltage at controller input terminals 9 and base 36B to rise somewhat with respect to ground. When the induced voltage falls below the voltage on capacitor 70, the current flow through secondary winding 66 ceases due to the reverse voltage across diode 67, but capacitor 70 discharges slowly through resistors 71, 40 and 37 to ground to maintain substantially the raised voltage at base 36B. The voltage on base 36B falls slightly as capacitor 70 discharges, but increases more every time capacitor 70 is charged. As the voltage on base 36B progressively rises with respect to ground, the emitter voltage $V_E(36)$ falls by like amounts until $V_E(36)$ is less than $V_E(35)$ after reset and SCR 10 is not fired, cutting off the current through primary winding 65 and so preventing integrating capacitor 70 from charging. When $V_E(36)$ is initially high, as a result of a large demand for heat, it will take many surges of charging current to charge capacitor 70 enough to reduce $V_E(36)$ below $V_E(35)$, permitting SCR 10 to conduct current to the load 3 on almost every power cycle. When $V_E(36)$ is initially low, as a result of little demand for heat, only one or a few surges of charging current may be required to charge capacitor 70 enough to reduce $V_E(36)$ below $V_E(35)$. Since integrating capacitor 70 discharges much more slowly than it charges, $V_E(36)$ may not again exceed $V_E(35)$ for a number of cycles, so that SCR 10 will conduct current to load 3 during only a small fraction of the total number of power cycles. The number of successive half cycles of conduction by SCR 10 between periods when no conduction occurs is known as a burst. The length of the burst as compared to the length between initiation of successive bursts therefore determines the proportion of power from source 2 that is delivered to load 3. Such power proportioning is known as burst length proportioning. There is also a reverse voltage induced in secondary winding 66, but it results in no current flow due to the reverse voltage across diode 67.

In order to obtain full wave energization of load 3, a slave fired SCR 16 is employed. When SCR 10 is conducting, current flows from the power source 2 at line terminal L2 through load terminal X2, primary winding 65, output terminal 8, and SCR 10 back to power source 2 at line terminal L1. This current flowing through primary winding 65 induces a forward voltage in tertiary winding 72 of a polarity tending to reverse bias the gate-cathode junction 16G–K but it is blocked by diode 74. Transformer 64, of which windings 65 and 72 are parts, is such that under no load conditions the induced voltage in tertiary winding 72 leads the voltage across primary winding 65. As a result of this transformer characteristic the blocked induced voltage falls to zero and begins to increase in the reverse direction before the power supply voltage across the primary winding 65 reaches zero at $\pi$. This reverse induced voltage causes a current to flow from tertiary winding 72 through current limiting resistor 73, blocking diode 74 in forward direction, and bias resistor 75 back to tertiary winding 72. Since the gate-cathode junction 16G–K is connected across bias resistor 75, the gate voltage $v_{GF}(16)$ is in phase with and proportional to the reverse voltage induced in tertiary winding 72. The forward gate voltage $v_{GF}(16)$, as shown in FIG. 4, starts at $j$, before line voltage L2–L1 reaches zero at $\pi$, and increases until the line voltage reaches zero at $\pi$, when SCR 16 is fired. The firing of SCR 16 permits current to flow beginning with zero line voltage at $\pi$ from the power source 2 at line terminal L1 through SCR 16 from anode A to cathode K, output terminal 8, load terminal X1, load 3, and load terminal X2 back to power source 2 at line terminal L2 until the line voltage drops to zero at $2\pi$. Current also flows simultaneously from the power source 2 at line terminal L1 through SCR 16 from anode A to cathode K, primary winding 65, and load terminal X2 back to power source 2 at line terminal L2. This current induces more reverse voltage in tertiary winding 72 resulting in the somewhat sinusoidal gate voltage $v_{GF}(16)$. Since any voltage induced in secondary winding 72 always has the same contour and is sufficiently positive to fire SCR 16 at $\pi$, the SCR 16 will fire at zero angle whenever it has been triggered and will continue to conduct until the voltage between line terminals L1 and L2 returns to zero at $2\pi$.

Because both SCR's 10 and 16 begin to conduct only at substantially zero firing angle and cease to conduct at substantially zero current, little if any electrical noise will be generated.

The operation of the modified circuit of FIG. 5 is substantially the same as operation of the circuit shown in FIG. 2 so only the differences in their operation will be described here. The value of phase-shifting capacitor 78 in parallel with bias resistor 33 is chosen to delay the resetting of flip-flop 12 nearly to $2\pi$, so that the flip-flop is turned on again, if there is a demand for heat, when the line voltage passes through zero at $2\pi$. This is necessary to prevent the Triac 77 from firing in the half cycle preceding the one intended to be controlled, since a Triac will pass current in either direction when triggered into condition. It has been found that the turn on of flip-flop 12 may shift if transistor 36 is overdriven in absence of some stabilizing device. Stabilizing capacitor 79 prevents such a shift from occurring. The triggering pulse of current resulting from voltage induced in secondary winding 59 flows from the secondary winding 59 through current limiting resistor 60, diode 61 and the gate to anode circuit 77G–A1 back to secondary winding 59, firing Triac 77. Since the turning on of the flip-flop 12 has been delayed to be substantially simultaneous with the passage of line voltage through zero at $2\pi$, the differentiated output of flip-flop 12, the turn on of transistor, the voltage induced in the secondary winding 59, and the firing of Triac 77 will also occur substantially simultaneously with the passage of line voltage through zero so that little or no noise will result as load current begins to flow from the power source 2 at line terminal L2 through load terminal X2, load 3, load terminal X1, output terminal 8 and Triac 77 from anode A2 to anode A1 back to the power source 2 at line terminal L1. Current will also flow from the line terminal L2 through load terminal X2, primary winding 65, output terminal 8 and Triac 77 from anode A2 to anode A1 back to the power source 2 at line terminal L1. These current will continue to flow until Triac 77 ceases to conduct when the current flow is substantially bero so that again there is little, if any, noise generated. The current flow through primary winding 65 induces a voltage in teriary winding 72 tending to cause a current to flow from tertiary winding 72 through the anode to gate circuit 77A1–G, diode 74 and current limiting resistor 73 back to secondary winding 72, but it is blocked by the reverse polarity on diode 74. Transformer 64, once again, is such that under no load conditions the induced voltage in tertiary winding 72 leads the voltage across primary winding 65. As a result of this transformer characteristic the blocked voltage falls to zero and begins to increase in the reverse direction before the power supply voltage across the primary reaches zero at $\pi$. This reverse induced voltage causes a current to flow from tertiary winding 72 through current limiting resistor 73, blocking diode 74 in forward direction and the gate to anode circuit 77G–A1 back to tertiary winding 72. Since the gate 77G is positive, just as it was when energized from secondary 59, there is no change in energization when the current through the power terminals from 77A2 to 77A1 falls to zero at $\pi$, and since the Triac 77 will conduct in either direction when energized, current will immediately begin to flow through the power terminals from 77A1 to 77A2 when the power supply voltage reverses at $\pi$.

Although the condition sensitive signal source 4 is shown as a variable resistance shunting resistor 42, it could alternatively shunt resistor 45. Other signal sources could be substituted for the variable resistor. One substitute could be an on-off switch. Another substitute could be a transistor. The aforementioned Brace Patent 3,305,176 discloses a transistor adapted to shunt resistor 42 and controlled by a circuit adapted to receive its power supply through sensor terminal 43 and ground terminal 46. In general, any sort of variable shunting device or suitable variable voltage source could be employed. If a condition responsive voltage source were used, the voltage divider 13 could be eliminated and the variable voltage applied directly to signal terminal 48.

While a flip-flop has been described in detail, the invention is not limited to the use of a flip-flop. Any device providing bistable operation in response to the magnitude of the input received could be used. The substitution of other equivalents will also become obvious. The scope of the invention is limited only by its claims.

It may be well to point out that an alternating power supply is merely a special kind of pulsed power supply as the latter is used in this disclosure. It supplies consecutive pulses of power of opposite polarity.

The basic method employed in both of the circuits described above can be used in other circuits as well. It involves furnishing a condition responsive input signal, providing a direct current output of one magnitude when the input is greater than a predetermined magnitude and of another magnitude when the input is less than said predetermined magnitude, supplying a signal synchronized with and substantially instantaneously proportional to the voltage of the power supply being controlled, applying the synchronized signal as an overriding input signal to reset the output to a predetermined one of said magnitudes before the voltage begins to increase from zero in a direction permitting forward conduction by the controlled latching switch, differentiating the output, and employing the differentiated output to trigger the switch into conduction. When the power supply is unidirectional, or when a bidirectional latching switch is being used, an additional step is required. It covers shifting the phase of the synchronized signal with respect to the voltage of said power supply so that the differentiated output triggers the latching switch into conduction as the voltage of the power supply passes through zero. This step is not required when a unidirectional latching switch controls current from a bidirectional (alternating) power supply. A modification, employed in both of the described circuits, involves supplying a reference input signal as said predetermined magnitude and comparing the magnitudes of said input signals before providing the output.

I claim as my invention:

1. A method for firing at zero angle a latching switch in series with a load and a source of pulsed power, comprising the steps of furnishing a condition responsive amplitude modulated signal as an input, providing one value of direct current output when said input exceeds a predetermined magnitude and another value of direct current output when the input is less that the predetermined magnitude, obtaining an overriding signal from and synchronous with the voltage of said source of pulse power, applying said overriding signal to reset the output to a predetermined one of the output values before said voltage begins to rise from zero in a direction permitting forward conduction through the switch, differentiating said output, and using the differentiated output to trigger the switch into conduction.

2. A method according to claim 1 in which the output is provided after supplying a reference signal as a second input, the value of said reference signal being said predetermined magnitude, and comparing the values of said condition responsive signal and said reference signal.

3. A method according to claim 1 with the additional step of shifting the phase of said overriding signal before applying the overriding signal to reset the output by an amount to cause resetting to occur substantially at zero voltage of the source of power.

4. In an electrical controller for a flow of load current from a source of pulse power to a load in compliance with the value of a condition responsive amplitude modulated signal comprising a latching switch for passing said load current from the power source to the load after being rendered conductive and having a control terminal for receiving an energizing signal to render said switch conductive, a first power terminal for connection to said power source and a second power terminal for connection to the load; a bistable means having an input terminal for receiving said condition responsive signal as an input and providing a direct current output having a first value when said input is less than a predetermined magnitude and having a second value when the input is greater than said predetermined magnitude; means for generating a signal synchronized with the voltage of said power source connected to said bistable means to apply the synchronized signal as an overriding input to reset the output to a predetermined one of said values; and a differentiator receiving the output and supplying a differentiated output to the control terminal of said latching switch.

5. An electrical controller according to claim 4 having a negative electrical feedback circuit from the second power terminal to the bistable means providing a feedback signal as an input proportional to a time function of said load current.

6. An electrical controller according to claim 4 having a source of direct voltage, and means for providing a reference signal, and in which said bistable means is a flip-flop connected across said direct voltage source and having a first input terminal for receiving said condition responsive signal as a first input and a second input terminal for receiving the reference signal representing the predetermined magnitude as a second input, said synchronized signal being applied to one of the input terminals as an overriding input.

7. An electrical controller according to claim 4 in which the generated synchronized signal is substantially instantaneously proportional to the voltage of said power source.

8. In an electrical controller for a flow of load current from a source of alternating power to a load in compliance with the value of a condition responsive amplitude modulated signal comprising a latching switch for passing said load current between the power source and the load after being rendered conductive and having a control terminal for receiving an energizing signal to render said switch conductive, a first power terminal for connection to said power source, and a second power terminal for connection to the load; a bistable means having an input terminal for receiving said condition responsive signal as an input and providing a direct current output of a first value when said input is less than a predetermined magnitude and a second value when the input is greater than said predetermined magnitude; a transformer connected across said source of alternating power supplying a signal synchronous with the voltage of said power source to the bistable means as an overriding input to reset the output to a predetermined one of said values prior to said voltage rising above zero with a polarity permitting conduction through the switch; and a differentiator receiving said output and supplying a differentiated output as the energizing signal to the control terminal of said switch.

9. An electrical controller according to claim 8 having a diode between said transformer and the bistable means to pass said synchronous signal only in a direction to reset the output to said predetermined value.

10. An electrical controller according to claim 8 having a negative integrating feedback from the second power terminal to said input terminal.

11. An electrical controller according to claim 8 having phase-shifting means for timing the application of said synchronous signal to the bistable means to reset the output substantially simultaneously with passage of said voltage through zero toward said polarity permitting conduction through the switch.

12. An electrical controller according to claim 11 having said latching switch bidirectionally conductive and a slaved firing circuit providing said energizing signal to said control terminal while said voltage is passing through zero in the opposite direction.

13. An electrical controller according to claim 12 in which said firing circuit is slaved to conduction of the load current through the load.

References Cited

UNITED STATES PATENTS 3,283,179 11/1966 Carlesle et al.
3,356,784 12/1967 Bertaili et al.
3,358,218 12/1967 Halpen _____ 317—148.5
3,363,143 1/1968 Cavanaugh.

DONALD D. FORRER, Primary Examiner
B. P. DAVIS, Assistant Examiner

U.S. Cl. X.R.
307—235, 305, 308—210; 323—22